United States Patent
Memos

(10) Patent No.: US 6,975,707 B2
(45) Date of Patent: Dec. 13, 2005

(54) PERSONAL CALLER ID

(76) Inventor: George Memos, 5935 Liebig Ave., Riverdale, NY (US) 10471-1609

( * ) Notice: Subject to any disclaimer, the term of this patent is extended or adjusted under 35 U.S.C. 154(b) by 39 days.

(21) Appl. No.: 10/718,399

(22) Filed: Nov. 20, 2003

(65) Prior Publication Data

US 2004/0105531 A1 Jun. 3, 2004

Related U.S. Application Data

(63) Continuation of application No. 09/246,177, filed on Feb. 4, 1999, now Pat. No. 6,693,995.

(60) Provisional application No. 60/088,345, filed on Jun. 8, 1998.

(51) Int. Cl.[7] .............................................. H04M 1/64
(52) U.S. Cl. .................... 379/67.1; 379/68; 379/88.09; 379/88.23
(58) Field of Search ...................... 379/67.1, 68, 88.09, 379/88.22, 88.23, 88.1, 88.11; 455/412.1, 455/412.2, 414.1

(56) References Cited

U.S. PATENT DOCUMENTS

| | | | |
|---|---|---|---|
| 3,810,316 A | 5/1974 | Lahlou | |
| 3,935,390 A | 1/1976 | Winterhalter | |
| 4,079,200 A | 3/1978 | Meri | |
| 4,995,075 A | 2/1991 | Angiolillo-Bent et al. | |
| 5,265,145 A | 11/1993 | Lim | |
| 5,276,731 A | 1/1994 | Arbel et al. | |
| 5,349,638 A | 9/1994 | Pitroda et al. | |
| 5,394,445 A | 2/1995 | Ball et al. | |
| 5,400,393 A | 3/1995 | Knuth et al. | |
| 5,432,844 A | 7/1995 | Core et al. | |
| 5,481,594 A | 1/1996 | Shen et al. | |
| 5,490,205 A | 2/1996 | Kondo et al. | |
| 5,559,860 A | 9/1996 | Mizikovsky | |
| 5,602,908 A | 2/1997 | Fan | |
| 5,604,791 A | 2/1997 | Lee | |
| 5,778,053 A | 7/1998 | Skarbo et al. | |
| 5,822,416 A | 10/1998 | Goodacre et al. | |
| 5,881,134 A | 3/1999 | Foster et al. | |
| 5,963,626 A | 10/1999 | Nabkel | |
| 5,978,451 A | 11/1999 | Swan et al. | |
| 5,995,603 A | 11/1999 | Anderson | |
| 6,067,348 A | 5/2000 | Hibbeler | |
| 6,266,399 B1 | 7/2001 | Weller et al. | |
| 6,347,133 B1 * | 2/2002 | Galbreath | 379/67.1 |
| 2001/0043680 A1 * | 11/2001 | Scheel | 379/70 |

* cited by examiner

Primary Examiner—Rexford Barnie
(74) Attorney, Agent, or Firm—Lerner, David, Littenberg, Krumholz & Mentlik, LLP

(57) ABSTRACT

The present invention provides an apparatus for efficient communication of messages such as voice messages in a telephone answering system. The apparatus includes an input to receive an incoming call, a recorder for recording outgoing messages, a memory to store incoming and outgoing messages, a comparator for comparing caller information to a client list, a player for playing a particular outgoing message to a calling party if the caller information matches a specific client in the client list, and a menu for identifying members of the client list and to identify locations in the memory for each of the members. The particular outgoing message includes a question previously posed by the specific client and a response to the question.

5 Claims, 3 Drawing Sheets

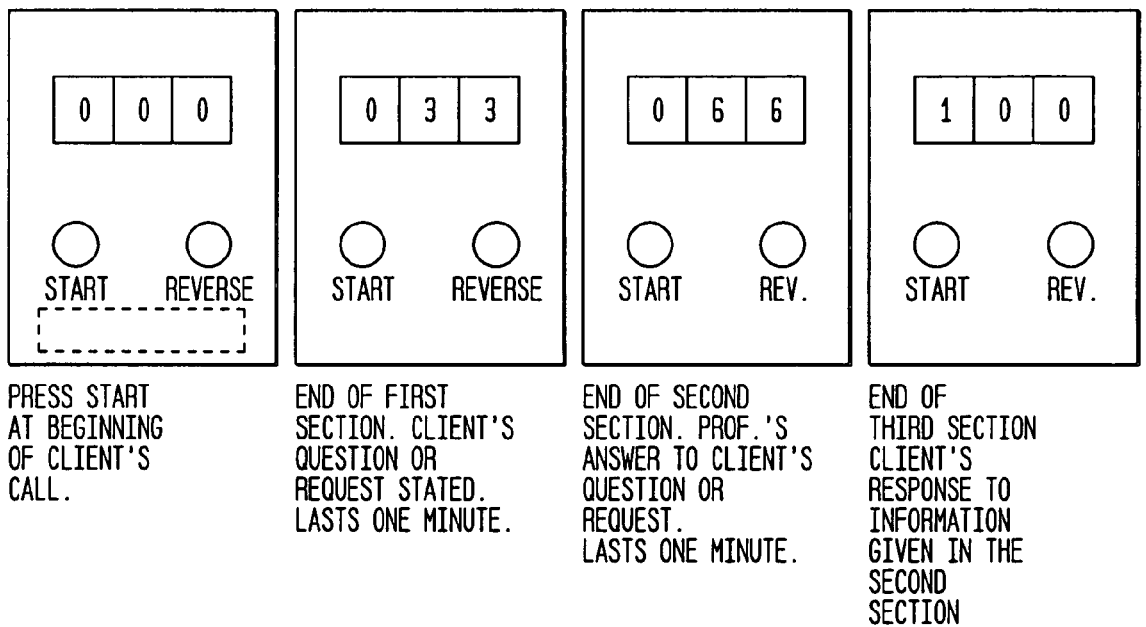

PERSONAL CALLER ID

CROSS REFERENCE TO RELATED APPLICATIONS

This application is a continuation of U.S. patent application Ser. No. 09/246,177, filed Feb. 4, 1999 now U.S. Pat. No. 6,693,995, entitled PERSONAL CALLER ID, and claims the benefit of U.S. Provisional Patent Application Ser. No. 60/088,345, filed Jun. 8, 1998, entitled PERSONAL CALLER ID, the entire disclosures of which are hereby incorporated by reference.

BACKGROUND OF THE INVENTION

The present invention relates generally to messaging systems and, more specifically, to messaging systems that efficiently store and manage incoming and outgoing messages in a personalized messaging environment.

In the past, answering machines and answering services have enabled callers and recipients to communicate by leaving each other messages. Some systems are even capable of identifying specific callers using calling line identification information, commonly known as "caller ID." Once a calling party is identified through the calling line identification information, a pre-selected outgoing message may be played for the calling party.

A persistent problem has been the inability of calling systems to associate incoming and outgoing messages with one another as part of a unified message. For example, outgoing messages are often stock messages prepared for a number of callers. The stock messages may be played to incoming callers based upon the caller ID information, time of day, day of the week, etc. Such "canned" messaging does not permit both parties to exchange information and communicate effectively, especially if the calling party seeks to obtain information about a particular topic or pressing issue. Therefore, there is a need for enhanced messaging in order to overcome this and other problems associated with existing messaging systems.

SUMMARY OF THE INVENTION

In accordance with one embodiment of the invention, an apparatus for processing a set of messages is provided. The apparatus includes a first memory, a recorder, an input, a comparator, a menu and a player. The first memory is operable to store messages. The recorder is operable to record an outgoing message by a user for a specific client. The outgoing message includes a question previously posed by the specific client and a response to the question. The recorder records the outgoing message in the first memory. The input is operable to receive an incoming call from a calling party. The comparator is operable to compare calling party information of the incoming call to a client list. The menu is operable to identify members of the client list, and to identify a location in the first memory for each of the members. The player is operable to play the outgoing message to the calling party if the calling party information matches to the specific client in the client list. The recorder is operable to record an incoming message from the calling party in the first memory after the outgoing message is played. The incoming message is associated with the outgoing message in the first memory. Thus, the user can retrieve the outgoing message and the incoming message as a unit.

The apparatus preferably further includes an output that is capable of redirecting the incoming call to an answering machine if the calling party information does not match any specific client in the client list. Alternatively, the apparatus may include a second memory. The second memory can store at least a portion of the incoming message. In this case, the second memory may also be able to store at least a portion of the outgoing message, which is associated with the portion of the incoming message. In another alternative, the first memory is a tape. In this case, the tape may include different segments for different calling parties. Here, each segment includes a first portion for a question, a second portion for a response to the question, and a third portion for a reply to the response.

In accordance with another embodiment of the present invention, a client meter is provided. The client meter is used by a calling party in a messaging system, and is provided to the calling party by a called party. The client meter includes a timing counter, a start button and a reverse button. The timing counter identifies timing information associated with a multi-part message. The timing information is provided by the called party, which prepares a first segment of the multi-part message. The start button starts the timing counter and the reverse button reverses the timing counter. The timing counter is operable to supply the timing information to the calling party. This facilitates recording of a second segment of the multi-part message by the calling party. The called party determines the timing information prior to providing the client meter to the calling party.

In an example, the first segment preferably includes a first portion including a question and a second segment including an answer to the question. In this case, the second segment preferably includes a third portion including a reply to the answer. More preferably, the first, second and third segments are represented by equal amounts of time on the timing counter. In another example, the called party records the first segment of the multi-part message in a memory prior to providing the client meter to the calling party. The calling party records the second segment of the multi-part message in the memory after listening to the first segment.

BRIEF DESCRIPTION OF THE DRAWINGS

FIG. 2 illustrates exemplary entries in a logbook in accordance with aspects of the present invention.

FIG. 3 illustrates operation of a client meter in accordance with aspects of the present invention.

DETAILED DESCRIPTION OF THE PREFERRED EMBODIMENTS

The present invention is directed to improvements pertaining to the telephone and caller identification services.

The present invention makes for a more efficient use of time, whether for personal use or for business use. It will lend convenience and will greatly help the blind. Those that cannot move around easily will also be helped. The imagination can come into play, selecting a tune or sound to represent an individual is limitless. Business will benefit by having well thought out responses to inquiries to their clients. These calls can be recorded and stored as a record. Objects of the invention are to make for a more efficient use of time and lend convenience.

Figure 1:
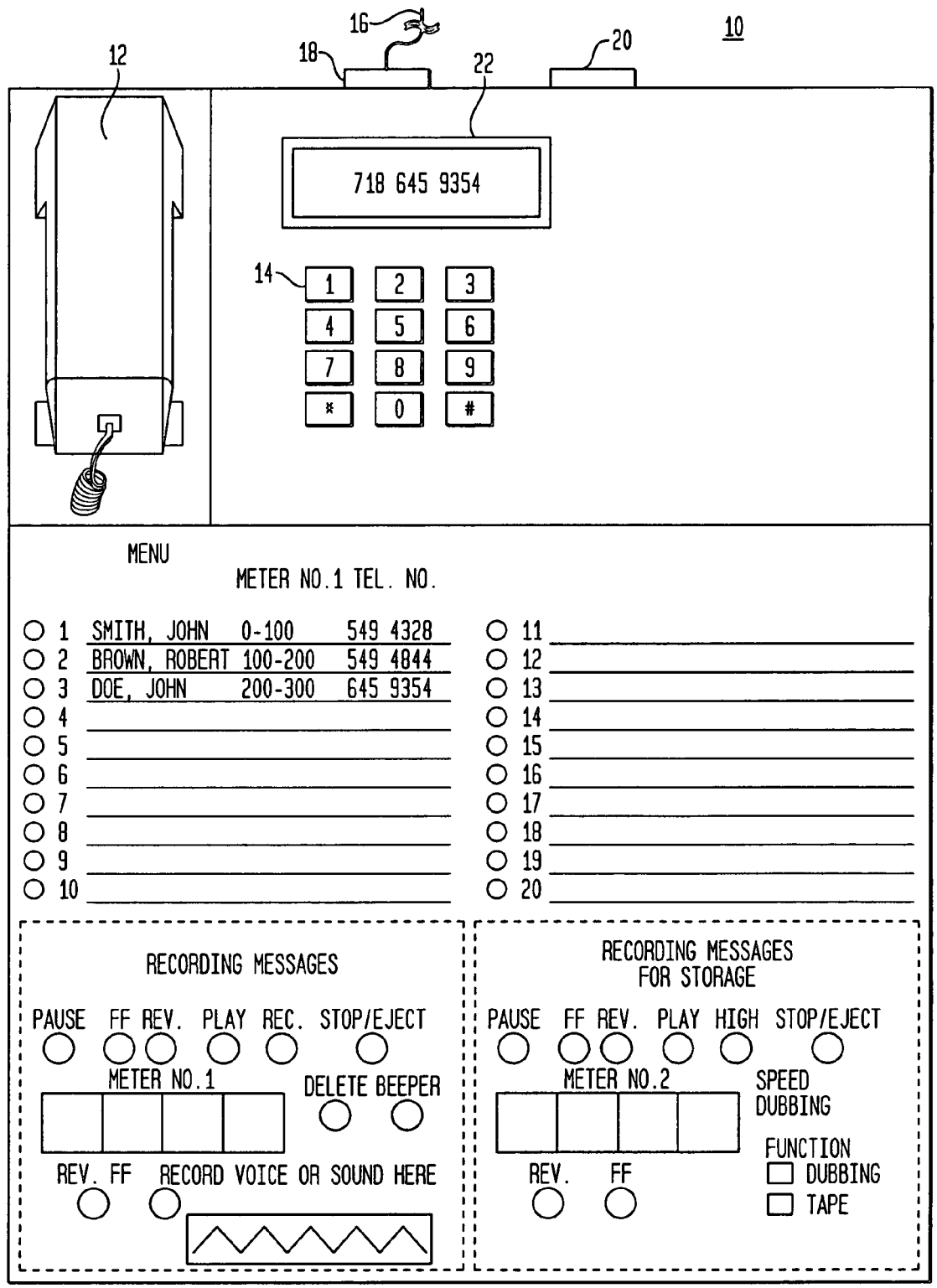
FIG. 1 illustrates a communication apparatus in accordance with aspects of the present invention.

Personal caller identification is an improvement on conventional answering machines and answering services. In accordance with aspects of the invention, when someone calls, the number associated with the caller identification will activate a tape that will play a tune or sound identifying the caller. A person can be anywhere in hearing range and know who is calling. Each expected caller will have a section of the tape with his or her tune or sound as identification. The tape may be numbered, as in a cassette tape. As seen in FIG. 1, there is preferably a menu on the telephone machine or device 10 identifying each caller and the block of numbers or range in memory set aside for that caller. For example, Robert Brown may be the second person listed on the menu, along with his telephone number and range in memory (meter range 100–200). The telephone includes components to record and store the messages or delete them, as seen at the bottom of the telephone 10. The user can use the handset 12 to record messages and play them back. The telephone 10 also includes the functionality to record the tune or sounds for each prospective caller's numbered section on the tape. A button will be available to turn the tape to the desired number on the tape or point to the appropriate location in memory.

By way of example, when the telephone 10 rings, it will ring twice. The number associated with the caller identification preferably starts a tape. This tape plays a tune or sound that identifies the caller to the called party. The caller will not hear these sounds. The called party can be anywhere within hearing range, and the person will know who is calling by the tune or sound. The called party does not have to stop what he or she is doing to find out who is calling. Each expected caller would preferably be identified by a different tune or sound. The tune could be associated, e.g., with the caller's personality or his or her relationship to the person he or she is calling. A user can, instead of a tune or sound, just record the person's name, saying it over and over with appropriate comments.

This information can be put on a storage medium, preferably on tape, with each caller identification number having a section of the tape that is numbered. By way of example only, the numbers could be 1 to 1000. The numbers will be visible on the machine as the tape plays, as seen by Meter No. 1 on the bottom left of the telephone 10. The telephone 10 desirably includes a in-built recording system to record the tune, sound or name on the numbered tape. Adequate space on the tape will be given for the identifying sound and a possible message, and a section on the tape for a reply. Each number on the caller identification will activate the tape to the section of the tape set aside for that number. At the end of the section set aside for a specific number or calling party, the tape will stop.

Preferably, there will be another tape that records a special message for a specific number or calling party. Again, each specific message for a specific number will have a block of numbers reserved or set aside on the tape. There will be a menu of all the names and telephone numbers of prospective callers and the numbers on the tape set aside for each caller.

EXAMPLE 1

A Special Message

Bob has to leave and is expecting a call from Alice. Bob can record, on the numbers of the tape set aside for Alice's telephone number, a message for Alice instead of waiting for her to call. When Alice calls, her number on the caller identification will activate the tape that is assigned to that number and will give her Bob's message.

EXAMPLE 2

A lawyer, businessman (the "professional"), etc. can record a message on the section of the tape set aside for each number representing a client. He or she can state a question the client wants answered, give a reply and leave a section of the tape for a response. The client can call anytime for this information. The client can call late at night or all weekend. Thus, the client may hear the professional restate the client's question, along with the professional's answer. Then the client can leave a reply to the answer on the reserved section of the tape. It can be seen that this type of messaging creates a pleasant environment in which the client and the professional can communicate effectively.

The lawyer, businessman, etc., after hearing these calls, can store these calls as a record on a separate tape or memory set aside to record calls, as seen by the "Recording Messages for Storage" portion of the telephone 10 in FIG. 1, or he or she can delete the call. The professional can use a record button and a button on his or her telephone 10 to bring the tape to the desired location on the tape, as seen by Meter No. 2 in the Recording Messages for Storage section. This allows the professional to record any client's reply as a record. The telephone 10 may also include a small light associated with each expected caller to identify if they called while the person was out. Thus, the light next to caller number 2, Robert Brown, may light up after he calls. All other calls may be processed as they would by a conventional answering machine.

In order to more fully understand the invention, a client-professional dialogue will now be described in relation to the flow diagram of FIG. 4. The professional and client had a prima face meeting or a first telephone call. The client asks the professional to look up some information or provide an answer to a question. The professional tells the client that a personal caller identification system will be used to get the information to the client. The client is given or sent a notebook with a pen and a small meter that can be put flat on a desk. (See FIG. 3). When the client calls, the regular caller identification in the telephone 10 registers the number and it is *decoded, as seen by the "detect incoming call" and "obtain caller identification number from incoming call" steps in FIG. 4. By decoding, it is meant that the telephone 10 is programmed to play a section of tape or a memory location allotted for that caller's telephone number. If the caller is on the menu, the client will hear the question he or she wants answered. It will last one minute. Continuing, the client will hear the answer or response to the question. It will last one minute. As the tape continues, the third section will be set aside for a response or reply by the client, after the client hears, "please record your response after the beep." The three sections will each last one minute. If the caller is not listed on the menu, his or her call is directed to an answering machine.

The meter is run by a small battery and has three digits and two buttons, e.g., start and reverse (See FIG. 3). The client is told to work out the response in the notebook so it will be concise and easily understood. This material in the notebook will become a record of what the professional and the client are working towards.

The client will press start on the meter that is flat on the desk in front of the client, at the beginning of the recording. The first section, the question, will use up 0 to 33 on the meter. Section two, the answer, will use up 33 to 66 on the meter. Section three, the response, will take up 66 to 100 on the meter. It is to be understood that these numbers are merely exemplary, and may differ depending on the storage medium, duration of messaging, etc.

As mentioned above, the client was asked to work out his or her response in the notebook to have as a record. This will be a time saver for both parties. The efficient messaging will be one minute of a concise and compact response. If the client wants to hear the call again, he or she can call again. The client can press reverse on the meter to get to 0 again. The client may call anytime during the week and all weekend.

The professional prepares the tape in the following manner. Each client will be listed on the menu (FIG. 1). Each client will, for example, have 100 numbers on Meter No. 1 (FIG. 1). If the professional wants to record a message for Client No. 3, Client No. 3 is assigned 200 to 300 on Meter No. 1, which can represent three minutes of playing time on the tape. The whole tape, if it has sixty minutes, can service 20 clients. After each hundred on Meter No. 1, 100 for each client, the tape automatically stops with the aid of a timer. The time limit can be adjusted depending on the needs of the professional. Meter No. 1 may be adjusted, and the 100 numbers for each client will remain the same. Meter No. 2 is preferably also adjusted to have 100 numbers for each call recorded and stored on the recording messages for storage tape. The switch, in function, is set at dubbing for recording a message and tape for rehearing a message When the professional has his or her work completed, he or she may start to record. The professional sets Meter No. 1 for Client No. 3 (FIG. 1). Meter No. 1 is set at 200. Now, the professional is ready to record. Of course, when the tape is recording, it is reflected on Meter No. 1. The professional presses the record button (FIG. 1) for recording messages and talks near the "record voice or sound here" button. The professional will record the question and use 200 to 233 on Meter No. 1. It will last one minute. Continuing, the professional will answer the question using up 233 to 266 on Meter No. 1. It will last one minute. Then, the professional will say, "please record your response after the beep," and the professional will press the beeper button. This section will last one minute. The tape will stop at the end of the response with the aid of a timer. Meter No. 1 will, of course, have the number 300. The recording is then ready for the client.

After the client calls and hears the recording and records his or her response, the button on the left side of the client's name, using a timer, lights up. When the professional wants to hear the call, the professional presses the lighted button and, with the aid of a timer, reverses to 200 on Meter No. 1 and plays to 300 on the meter. If the professional wants to save the call, he or she presses the reverse button on Meter No. 1 to go from 300 to 200. The professional then presses the play button on "recording messages for storage" section and simultaneously presses the "high speed dubbing" button as well. The call will be recorded and stored either in the same or a different memory. After the professional records the call, he or she will record in his or her notebook (FIG. 2), on the page set aside for that Client, the date the client called, a note on the call and the numbers used on Meter No. 2. When the professional wants to hear the call again, he or she will adjust Meter No. 2 connected to the tape used for recording messages for storage and hears the call again (FIG. 1). For example, if the professional wants to hear John Doe's call of Jun. 10, 1999 again (FIG. 2), Meter No. 2 is set at 1500 and the professional presses play of the tape, recording messages for storage. With the aid of a timer, Meter No. 2 stops at 1600. The call has been heard. The switch, in function, is set at dubbing for recording a message and tape for rehearing a message (FIG. 1). If the professional does not want to save the call, he or she presses delete using the same method as on an answering machine. The call is automatically deleted.

The system of the present invention will now be described in more detail. FIG. 1 has a view of an illustrative personal caller identification device, the telephone 10, in accordance with the present invention. No. 12 is the handset or receiver and a numeric keyboard 14 is also provided. Device 10 is connected to a standard telephone line 16 via input jack 18. An output jack 20 is provided to the standard telephone line 16 via input jack 18 for attachment of other telephone line equipment. Display 22 displays the caller identification number transmitted with the telephone call through the telephone network that identifies the telephone number from which the calling party is calling. This can be done by means of fiber optics associated with the telephone line that can transmit or receive information. Fiber optics may also be used with this invention to decode an incoming telephone number, activate a series of timers and play a section of the recording messages tape assigned to that number.

The menu may have 20 or more names of clients. On the menu, each client is preferably assigned 100 numbers (e.g., a counter range from 201 to 300) on Meter No. 1. The telephone numbers of each client may be manually added or taken off the list. This can also be done digitally with information going through a telephone line 16 and then turned into numbers. This is an over-simplification of a telecommunication art that has manifested itself in remarkable works.

Meter No. 1 has four digits with a button for reverse and fast forward. The tape or memory for recording messages has pause, fast forward, reverse, play, record, stop/eject, delete and beeper. The short lines ( - - - ) indicate where the tape for the "recording messages" is located. The "recording messages" section is used by the professional to record his or her messages. The professional records or speaks near the "record voice or sound here" section. Meter No. 2 has a button for recording messages for storage. Buttons for the "recording messages for storage" section are pause, fast forward, reverse, play, high speed dubbing and stop/eject. The recording messages for storage tape has a switch for controlling dubbing and tape playing. It is used as in a regular tape recorder. When copying a message, the switch will be on dubbing. When rehearing a message, the switch will be on tape.

FIG. 2 shows the page in the professional's notebook for John Doe. Each client will have a page in the notebook to provide a record or log of discussions with that client. It will include the client's name, telephone number and calls recorded. The date the client called and a notation about the call will also be recorded. When the tape is complete, another tape will be placed in its place and will be labeled as recording messages for storage tape no. 2.

FIG. 3 shows the meter the professional gives or sends to the client. It shows the meter before the call and the dotted lines indicating where the battery is located. FIG. 3 also shows how the meter increments as the user listens to and records messages.

Figure 4:
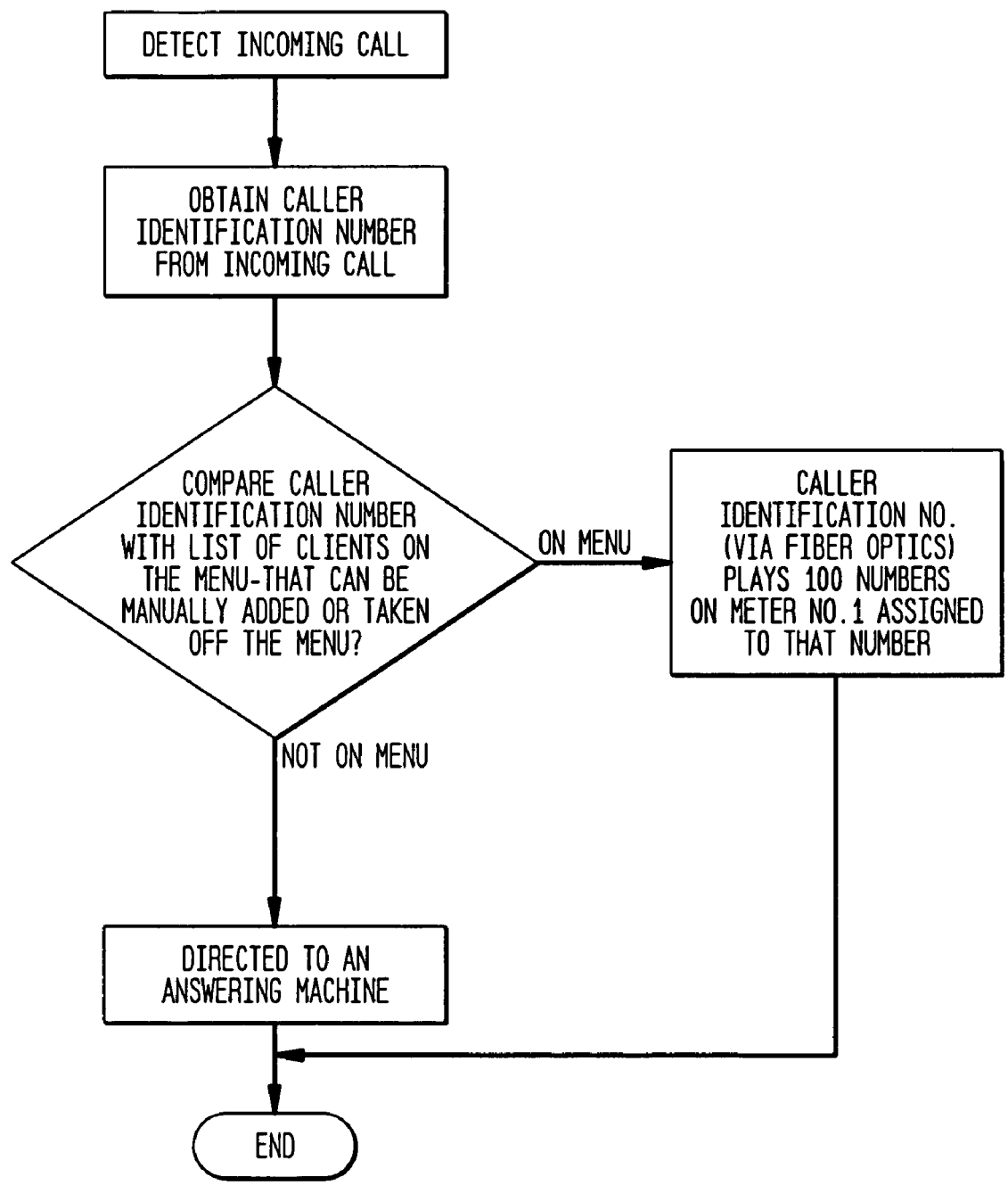
FIG. 4 is a flow diagram illustrating system operation in accordance with aspects of the present invention.

FIG. 4 is a flow chart of the steps involved in the use of the present invention. The telephone rings and the caller identification number is displayed on the display 22 (See FIG. 1). The caller identification number is compared to the list on the menu of the telephone/device 10. If it is not on the menu, the call is directed to an answering machine, e.g., with the use of the output jack 20 to the standard telephone line 16 via the input jack 18. If the caller identification number is on the menu, it is decoded (and plays, e.g., the 100 numbers on Meter No. 1 assigned to that number. For example, if John Doe calls, his number is displayed on the display 22. It is decoded and the messaging is played from the portion of the memory or tape, e.g., 200 to 300, on Meter No. 1. It stops with the use of a timer, and the light on the left of his name goes on to signal that John Doe called.

The professional may add or delete telephone numbers manually from the menu with a mechanical switch. Today, it is possible to program the different operations with a computer. It is known in the art that all of this information can be stored in a chip in the telephone to perform all of the operations necessary in the present invention. Wherever the technical improvements in the art may lead, the nucleus of the present invention will remain constant. This nucleus is that the present invention can state a client's question or request for information, answer the question or give the requested information, and a response to the question or information can be given all in one telephone call. All of this can be recorded and stored together, e.g., on one tape.

The power source for the system to perform the present invention may be a battery, a telephone line or an electrical outlet. A computer chip in the telephone and the power source constitute a complete circuitry.

When the client calls, the regular caller identification registers the number, and it is decoded, i.e., it is programmed to play a section of tape allotted for that number. This tape is associated with the "recording messages" portion of the device 10 (FIG. 1). The names are listed on the menu of the device, with the numbers allotted for each caller placed after the caller's name.

The client will hear the question he or she wants answered. It will last one minute. Continuing, the client will hear the question answered or the information he or she requested. As the tape continues, the third section will be set aside for a response by the client after the client hears, "please record your response after the beep." The three sections will each last one minute. Thus, it can be seen that the present invention solves the problems associated with past messaging systems and provides a cohesive personalized messaging system.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A client meter for use by a calling party in a messaging system, the client meter being provided to the calling party by a called party, the client meter comprising:
   a timing counter to identify timing information associated with a multi-part message, the timing information being provided by the called party that prepares a first segment of the multi-part message;
   a start button to start the timing counter; and
   a reverse button to reverse the timing counter;
   wherein the timing counter is operable to supply the timing information to the calling party, thereby facilitating recording of a second segment of the multi-part message by the calling party, and the called party determines the timing information prior to providing the client meter to the calling party.

2. The client meter of claim 1, wherein first segment has a first portion including a question and a second portion including an answer to the question.

3. The client meter of claim 2, wherein the second segment has a third portion including a reply to the answer.

4. The client meter of claim 3, wherein first portion, the second portion and the third portion are represented by equal amounts of time on the timing counter.

5. The client meter of claim 1, wherein the called party records the first segment of the multi-part message in a memory prior to providing the client meter to the calling party, and the calling party records the second segment of the multi-part message in the memory after listening to the first segment.

* * * * *

UNITED STATES PATENT AND TRADEMARK OFFICE
CERTIFICATE OF CORRECTION

PATENT NO. : 6,975,707 B2  Page 1 of 1
DATED : December 13, 2005
INVENTOR(S) : George Memos It is certified that error appears in the above-identified patent and that said Letters Patent is hereby corrected as shown below:

Column 5,
Line 28, insert -- . -- after "message".

Column 7,
Line 3, delete "(" before "and".

Column 8,
Lines 27 and 32, insert -- the -- between "wherein" and "first".

Signed and Sealed this

Twenty-fifth Day of April, 2006

JON W. DUDAS
*Director of the United States Patent and Trademark Office*